United States Patent Office 3,221,008
Patented Nov. 30, 1965

3,221,008
ION EXCHANGE PROCESS FOR THE RECOVERY OF IONIC ORGANIC SUBSTANCES
Frank J. Wolf, Westfield, and Irving Putter and George V. Downing, Jr., Martinsville, and James Gillin, Westfield, N.J., assignors to Merck & Co., Inc., Rahway, N.J., a corporation of New Jersey
No Drawing. Filed Jan. 30, 1962, Ser. No. 169,951
8 Claims. (Cl. 260—210)

This application is a continuation-in-part of our copending application Serial No. 833,106, filed August 11, 1959, which is in turn a continuation-in-part of our prior application Serial No. 660,485, filed May 21, 1957 and both now abandoned.

This invention relates to a process for the recovery of organic substances and more particularly to a method for recovering ionic organic substances from adsorption on ion exchange resins.

Ion exchange techniques for the isolation and recovery of organic compounds from solutions containing these compounds have been known for some time. One of these techniques finding considerable use has been that of adsorption-elution whereby a desired organic component in a mixture has been selectively adsorbed upon a suitable ion exchange resin and thereafter eluted from said ion exchange resin by use of a suitable eluting solution. However, numerous problems have been encountered in the elution or organic substances from adsorption on ion exchange resins which have seriously limited the usefulness of this technique. For example, certain organic substances are so strongly adsorbed on ion exchange resins that their recovery from the resin utilizing elutrients heretofore disclosed has either been impossible or has resulted in recoveries which are not satisfactory for commercial purposes. Additionally, the elution of other organic substances from ion exchange resins with elutrients heretofore known has been unsatisfactory because it has been found that these elutrients inactivated or destroyed the organic substances sought to be recovered. Furthermore, it has been found that the suitability of certain of the elutrients heretofore disclosed for recovering organic substances from ion exchange resins is critically dependent upon the nature of the resin used for adsorbing the organic substance, pH and other factors. Obviously, then, elutrients of this nature have only limited application. Still further, it has been found that when certain of the elutrients disclosed in the prior art are used for the elution of organic substances from ion exchange resins, frequent regeneration of the resin is necessary with the result that the over-all adsorption-elution process is rendered more costly and time consuming.

According to the present invention, it has been found that a wide variety of ionic organic substances, particularly organic acids and bases, which have been adsorbed on ion exchange resins, can be readily eluted therefrom by the use of a series of heretofore undisclosed elutrients. These elutrients comprise a water-miscible organic solvent, water and a salt. The mixture of organic solvent and salt is selected so that the salt is soluble in the resulting organic solvent-water mixture and the organic substance being eluted from the ion exchange resin is soluble in the organic solvent-water-salt mixture. In addition, it is necessary that any materials appearing in the eluate likewise be soluble in the solvent-salt mixture, in order that the elution proceed without clogging of the ion exchange resin.

Utilizing the elutrients of the present invention for the recovery of ionic organic substances which have been adsorbed on ion exchange resins, certain advantages are obtained which greatly enhance the usefulness of the ion-exchange elution process. For example, using relatively small amounts of these elutrients, a wide variety of ionic organic substances, including in particular those which cannot be satisfactorily eluted or are otherwise adversely affected by the use of elutrients heretofore known, can be recovered from the ion exchange resins on which they are adsorbed in high yields.

To illustrate, it has been known that various ion exchange resins have high capacities for the adsorption of penicillin. Eluting the adsorbed penicillin, however, has been a major problem. Elution with acids or bases renders the penicillin inactive. Elution with aqueous salt solutions, although removing penicillin from the resins, requires very large volumes of eluting solutions, rendering the recovery impractical. Elution with the novel solvent-salt elutrients of this invention has resulted in a practical ion exchange isolation process for penicillin.

Likewise, in the case of novobiocin, attempts to elute this antibiotic from quaternary amine anion exchange resins upon which it has been adsorbed, have resulted in recoveries of the antibiotic which are not satisfactory for commercial purposes. Elution of novobiocin with aqueous alkali results in complete inactivation of the antibiotic. Elution with acids has the same effect, though to a somewhat lesser degree. Elution with the novel solvent-salt elutrients of the instant invention, on the other hand, results in higher yields than were obtainable by any previously known method and effects no inactivation of the antibiotic. In many of these difficult cases the novel elutrients of this invention may obviate the problems which have heretofore rendered commercially not feasible the process of ion exchange isolation.

Another advantage obtained in utilizing these elutrients for recovering ionic organic substances from adsorption on ion exchange resins stems from the fact that their capacity to elute ionic organic substances from the resins on which they are adsorbed is not dependent upon the nature of the ion exchange resin used to adsorb the organic substance, pH conditions or other factors.

A further advantage resulting from the use of the solvent-salt elutrients is that in the use of the solvent-salt eluting solutions, resin regeneration in most instances is not necessary since the use of these eluting solutions results in a kind of autoregeneration of the ion exchange resin.

While it is not desired to be bound by any particular theory of operation with regard to the process of this invention, a partial explanation of the effectiveness of the novel elutrients herein disclosed may be offered. Since elution of an adsorbed ion from an ion exchange resin may be considered to be an equilibrium reaction involving displacement of the adsorbed ion by another ion furnished by the elutrient, which may be generally represented, in the case of elution from a cation exchange resin, by the equation:

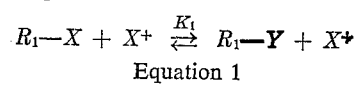

Equation 1 wherein $R_1-X$ represents the resin with the ion $X^+$ adsorbed thereon, $R_1-Y$ represents the eluted resin with the ion $Y^+$ being furnished by the elutrient, and $K_1$ represents the equilibrium constant for the reaction; or, in the case of elution from an anion exchange resin, by the equation:

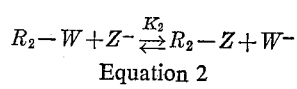

Equation 2 wherein $R_2-W$ represents the resin with the ion $W^-$ adsorbed thereon, $R_2-Z$ represents the eluted resin with the ion $Z^-$ being furnished by the elutrient, and $K_2$ represents the equilibrium constant for this reaction; it is possible to write an expression for the equilibrium constant for these equations. In the case of Equation 1, this expression would be:

$$K_1 = \frac{[R_1Y][X^+]}{[R_1X][Y^+]}$$

It is seen that elution should occur if $K_1$ is large, that is, if the equilibrium lies to the right in Equation 1. If, then, the medium in which the reaction is taking place is changed, the equilibrium constant may also be changed. This may be accomplished, in the case of the instant invention, by effecting a change in the dielectric constant of the medium by the use of a water-miscible organic solvent for the eluting salt. If this change in the equilibrium constant is sufficiently great to push the equilibrium in Equation 1 to the right, elution will then be possible.

Another explanation lies in the solubilizing effect of an organic solvent for hydrophobic portions of molecules, the ions of which are being adsorbed by ion exchange resins. Solubilization of the hydrophobic portion of the adsorbed ion will permit exchange between the eluting salt ion and the adsorbed ion and elution may then be accomplished.

Although the elutrients of the present invention may be used to elute a large number of ionic organic substances in high yields from ion exchange resins on which they are adsorbed, it should be noted that there may be certain instances wherein the use of these elutrients would be inoperative or not particularly desirable.

For the purpose of this invention, it is desirable to elute the ion exchange resin in a column-wise manner, although batch-wise elution can be used with equal facility.

Using the process of this invention, a wide variety of ionic organic compounds, including both weak and strong organic acids and organic bases, may be eluted from the ion exchange resins on which they are adsorbed. Thus, for example, the ionic organic substance may be a weak acid such as, for example, an amino acid, desoxycholic acid, folic acid, palmitic acid, nicotinic acid, ascorbic acid, citric acid; a strong acid such as, for example, prednisolone phosphate, heparin, vitamin $B_2$ phosphate, vitamin K phosphate; a weak base, such as, for example, morphine, quinine, yohimbine, reserpine; a strong base, such as, for example, vitamin $B_1$; a salt, such as, for example, methyl orange, potassium penicillin G, sodium novobiocin, vitamin $B_1$ hydrochloride; a fermentation elaboration product, such as, for example, penicillin, novobiocin, gibberellic acid, eulicin, cytovirin, etc.

It is to be understood that the present invention is directed solely to the elution of ionic organic substances from ion exchange resins on which they have previously been adsorbed. The selection of the particular ion exchange resin and the conditions employed whereby a desired ionic organic substance in a mixture is selectively adsorbed on the resin is well known in the art for many ionic organic substances and therefore forms no part of the instant invention.

The solvents employed for the elution are water-miscible organic solvents, for example, water-miscible alcohols, ethers, ketones, esters, amides and the like. Examples of such solvents are methanol, ethanol, isopropanol, ethylene glycol, dioxane, acetone, dimethylformamide, and the like. Other solvents such as dimethyl sulfoxide, for example, may be used in these eluting solutions, if desired. In general, the concentration of organic solvent in the elutrient mixture may vary over a wide range. Elutrient mixtures containing at least 50% by volume organic solvent are satisfactory. However, elutrient mixtures containing at least 70% by volume are preferred.

The concentration of water present in the elutrient mixture should be sufficient to permit the solubilization of the desired concentration of salt therein. However, the elutrient mixtures may contain as much as 40% by volume water or even higher, if desired.

Salts which may be used in the elutrients of this invention must be of an ionic nature and must be soluble in the organic solvent-water mixture. Likewise, where the salt used may determine the elution products of the process, the salt must be selected with this consideration in mind. As an illustration of this latter consideration, potassium acetate is readily soluble in 70% methanol-30% water and can be used to effect the elution of novobiocin. However, a mixture of potassium acetate and 70% methanol is not recommended where there may be residual chloride on the ion exchange resin, because the potassium chloride which would be thereby formed is not readily soluble in 70% methanol and could precipitate and plug the resin column. It is not critical whether the salt selected contains univalent, divalent or other polyvalent ions or whether it is basic, acidic or neutral in reaction, so long as the required solubility considerations are observed. Where it is desired to control the pH of the elution, however, this can be sometimes achieved by selecting salts which are slightly basic or slightly acidic in their nature. Organic salts may be used as well as inorganic salts. For example, acetates, propionates, butyrates, benzoates and chloroacetates, as well as amine salts, are satisfactory for this purpose. Certain organic salts, however, would not be sufficiently highly ionized to effect the elution or sufficiently soluble in the organic solvent-water mixture of the elutrient. In general, salts of the type which are ionized in the particular solvent mixture used are satisfactory for use in this invention. The concentration of salt in the elutrient mixture may vary from about 0.1 weight/volume percent to about 15 weight/volume percent. Preferably, however, the salt concentration is in the range of from about 1 weight/volume percent to about 10 weight/volume percent.

The process of this invention will be better understood by reference to the following examples. However, it is not intended by inclusion of these examples to limit in any way the scope of this invention. Rather, these examples are included for the purpose of exemplification. In addition to the exemplifications supplied, it is possible, using the process of this invention, to elute from ion exchange resins a wide variety of other organic compounds.

*Example 1*

To a mixture containing sodium dihydronovobiocin is added 50 ml. of "Dowex 1–X2" resin on the chloride cycle and the mixture stirred for 3 hours. "Dowex 1–X2" resin is a strongly basic styrene-divinylbenzene anion exchange resin deriving its ion exchange capacity essentially from quaternary ammonium groups and is available from the Dow Chemical Co., Midland, Mich. The resin is removed by filtration and washed with water. A 20 ml. aliquot of resin is eluted column-wise with five 20 ml. portions of an aqueous solution containing 70% by volume methanol and 5% (w./v.) ammonium chloride. The percentage of sodium dihydronovobiocin eluted from the resin is shown in Table 1.

TABLE 1

| Elutrient | Volume (ml.) | Dihydronovobiocin eluted (percent) |
|---|---|---|
| 70% methanol—5% ammonium chloride | 20 | 50 |
| Do | 20 | 33.3 |
| Do | 20 | 10 |
| Do | 20 | 3.3 |
| Do | 20 | .8 |
| Total | | 97.4 |

Example 2

Two l. of "Dowex 1–X2" resin, on the chloride cycle, is added to a mixture containing sodium novobiocin and the mixture stirred for 3 hours. The resin is separated by filtration and washed with water. 40 ml. aliquots of the resin are then taken, placed in chromatographic columns and eluted with various elutrients. The percentage of novobiocin eluted with the various elutrients is shown in Table 2. The elutrients are made up by dissolving the indicated quantity of salt in water, diluting to 60 ml. and then diluting this aqueous salt solution to 200 ml. with the indicated organic solvent.

TABLE 2

| Elutrient | Volume (ml.) | Novobiocin eluted (percent) |
|---|---|---|
| Methanol/ammonium chloride (10.7 g.) | 140 | 99.8 |
| Isopropanol/ammonium chloride (10.7 g.) | 150 | 99.3 |
| Dimethyl sulfoxide/ammonium chloride (10.7 g.) | 150 | 98.7 |
| Ethanol/ammonium chloride (10.7 g.) | 140 | 99.0 |
| Acetone/potassium iodide (33.2 g.) | 140 | 85.0 |
| Ethylene glycol/ammonium chloride (10 g.) | 120 | 39.7 |
| Dioxane/ammonium chloride (10 g.) | 116 | 66.3 |
| Methanol/calcium chloride (22.2 g.) | 120 | 84.9 |
| Methanol/dimethylamine hydrochloride (16.3 g.) | 120 | 89.7 |
| Methanol/lithium chloride (0.2 g.) | 2,000 | 85.0 |

Example 3

A mixture containing potassium penicillin G is passed through a column containing 100 cc. of "Amberlite IRA–401" resin, on the chloride cycle. "Amberlite IRA–401" resin is a strongly basic styrene-divinylbenzene resin deriving its ion exchange capacity essentially from quaternary ammonium groups and is available from Rohm & Haas Company, Philadelphia, Pa. The column is washed with 30% methanol and eluted with several portions of an aqueous solution containing 30% methanol by volume and 15% (w./v.) ammonium chloride. The percentage of potassium penicillin G eluted from the resin is shown in Table 3.

TABLE 3

| Elutrient | Volume (cc.) | Penicillin Eluted (percent) |
|---|---|---|
| 30% methanol/15% ammonium chloride | 60 | 1.7 |
| Do | 50 | 39 |
| Do | 55 | 15 |
| Do | 55 | 7 |
| Do | 50 | 4.2 |
| Do | 50 | 3.5 |
| Total | | 70.4 |

Example 4

A mixture containing potassium penicillin G is passed through a column containing 100 cc. of "Amberlite IRA–401" resin on the chloride cycle. The column is washed with 70% methanol and eluted with six 50 ml. portions of an aqueous solution containing 70% methanol by volume and 7.5% (w./v.) ammonium chloride. The percentage of potassium penicillin G eluted from the resin is shown in Table 4.

TABLE 4

| Elutrient | Volume (cc.) | Penicillin Eluted (percent) |
|---|---|---|
| 70% methanol/7.5% ammonium chloride | 50 | 11 |
| Do | 50 | 58 |
| Do | 50 | 25 |
| Do | 50 | 3.1 |
| Do | 50 | 2.6 |
| Do | 50 | .3 |
| Total | | 100 |

Example 5

A mixture containing morphine base is passed through a column containing 20 cc. of "Dowex 50–X2" resin, on the ammonium cycle. "Dowex 50–X2" resin is a strong acid type sulfonated polystyrene resin and is available from Dow Chemical Company, Midland, Mich. The column is washed with 30 ml. water and then eluted first with a 5% (by weight) aqueous ammonium chloride solution and then with an aqueous solution containing 70% methanol by volume and 5% (w./v.) ammonium chloride. The results are shown in Tables 5 and 5a.

TABLE 5

| Elutrient | Volume (cc.) | Morphine eluted (percent) |
|---|---|---|
| 5% ammonium chloride | 52 | 1 |

TABLE 5a

| Elutrient | Volume (cc.) | Morphine eluted (percent) |
|---|---|---|
| 70% methanol/5% ammonium chloride | 60 | 92.5 |
| Do | 20 | 1.5 |
| Total | | 94 |

Example 6

A mixture containing methyl orange is passed through a column containing 20 ml. of "Amberlite IRA–411" resin, on the hydroxide cycle. "Amberlite IRA–411" resin is a strongly basic styrene-divinylbenzene resin deriving its ion exchange capacity essentially from quaternary ammonium groups, and is available from Rohm & Haas Company, Philadelphia, Pa. The resin is washed with 20 ml. of water and then eluted first with a 70% methanol solution and then with an aqueous solution containing 70% methanol by volume and 5% (w./v.) ammonium chloride. The percentage of methyl orange eluted from the resin in each instance is shown in Tables 6 and 6a.

TABLE 6

| Elutrient | Volume (cc.) | Methyl Orange eluted (percent) |
|---|---|---|
| 70% methanol (aq.) | 100 | 0.02 |

TABLE 6a

| Elutrient | Volume (cc.) | Methyl Orange eluted (percent) |
|---|---|---|
| 70% methanol/5% ammonium chloride | 100 | 27 |
| Do | 100 | 25 |
| Do | 100 | 22 |
| Do | 100 | 13 |
| Do | 50 | 3 |
| Do | 300 | 6 |
| Total | | 96 |

The use of various other elutrients for the elution of methyl orange is illustrated in the following example.

Example 7

A mixture containing methyl orange is passed through a column containing 25 ml. of "Amberlite IR–45" resin, on the hydroxide cycle. "Amberlite IR–45" resin is a weak base type aminated polystyrene resin deriving its ion exchange capacity essentially from amino groups and is available from Rohm & Haas Company, Philadelphia, Pa. The resin is washed with 30 ml. of water. The percentage of methyl orange eluted from the resin with various conventional elutrients is shown in Table 7. The percentage of methyl orange eluted from the resin employing as the elutrient an aqueous solution containing 93% methanol by volume and 5% (w./v.) ammonium chloride is shown in Table 7a.

TABLE 7

| Elutrient | Volume (cc.) | Methyl Orange eluted (percent) |
|---|---|---|
| 70% methanol | 100 | 0.08 |
| 5% NH₄Cl (aq.) | 100 | 0.03 |
| 1 N NaOH (aq.) | 100 | 0.01 |
| 93% methanol | 100 | 0.1 |

TABLE 7a

| Elutrient | Volume (cc.) | Methyl Orange eluted (percent) |
|---|---|---|
| 93% methanol/5% NH₄Cl | 100 | 35 |
| Do | 100 | 20 |
| Do | 100 | 13 |
| Total | | 68 |

*Example 8*

189 l. of a filtered fermentation broth containing gibberellic acid is passed through a column containing 3.785 l. of "Dowex 1–X2" resin, on the chloride cycle. The resin is then washed with methanol and eluted with 5 resin volumes of an aqueous solution containing 3.5 g. ammonium chloride per 100 ml. of 96% methanol. 75% of the gibberellic acid is eluted from the resin.

*Example 9*

To 1 l. of a mixture containing gibberellic acid is added 50 ml. of "Dowex 1–X2" anion exchange resin, on the chloride cycle, and the mixture is stirred for 1 hour. The resin is separated by filtration and washed with methanol. The resin is then eluted column-wise with 250 ml. of an aqueous solution containing 93% methanol by volume and 3.5% (w./v.) ammonium chloride. 86% of the gibberellic acid is eluted from the resin.

*Example 10*

To 1 l. of a mixture containing gibberelic acid is added 50 ml. of "Amberlite IRA–401" resin, on the chloride cycle, and the mixture is stirred for 1 hour. The resin is separated by filtration and washed with methanol. The resin is then eluted column-wise with 250 ml. of an aqueous solution containing 93% methanol by volume and 3.5% (w./v.) ammonium chloride. The eluate is found to contain 98% of the gibberellic acid adsorbed by the resin.

*Example 11*

25 ml. of "Amberlite IRC–50" resin containing 47 mg. eulicin per ml. of resin is eluted column-wise with a 70% methanol/30% water solution containing 5 g. of ammonium chloride per 100 ml. 'Amberlite IRC–50" is a cation exchange resin deriving its exchange capacity essentially from carboxylic acid groups and is available from Rohm & Haas Company, Philadelphia, Pa. The percentage of eulicin eluted from the resin is shown in Table 8.

TABLE 8

| Elutrient | Volume (cc) | Eulicin eluted (percent) |
|---|---|---|
| 70% methanol/5% ammonium chloride | 12.5 | 24 |
| Do | 25 | 24 |
| Do | 37.5 | 19 |
| Do | 50 | 14 |
| Do | 62.5 | 7 |
| Do | 75 | 2 |
| Do | 87.5 | 2 |
| Do | 100 | 0 |
| Total | | 92 |

*Example 12*

30 ml. of "Amberlite IRC–50" resin containing 1.8 mg. cytovirin per ml. of resin is eluted column-wise with an aqueous solution containing 70% methanol by volume and 5% (w./v.) ammonium chloride. The percentage of cytovirin eluted from the resin is shown in Table 9.

TABLE 9

| Elutrient | Volume (cc.) | Cytovirin eluted (percent) |
|---|---|---|
| 70% methanol/5% ammonium chloride | 15 | 35 |
| Do | 30 | 15 |
| Do | 45 | 13 |
| Do | 60 | 11 |
| Do | 75 | 8 |
| Do | 90 | 5 |
| Total | | 87 |

*Example 13*

A mixture containing sodium desoxycholate is passed through a column containing 50 ml. of "Dowex 1–X2" resin, on the chloride cycle. The resin is washed with 70% methanol and eluted with three 50 ml. portions of a 1 M solution of ammonium chloride in 70% methanol–30% water solution. The results are shown in Table 10.

TABLE 10

| Elutrient | Volume (cc.) | Desoxycholic acid eluted (percent) |
|---|---|---|
| 70% methanol/1 M in ammonium chloride | 150 | 98 |

*Example 14*

A mixture containing zinc insulin is passed through a column containing 200 ml. of "Dowex 50–X1" resin, on the sodium cycle. The column is washed with water and then eluted with four 200 ml. portions of an aqueous solution containing 70% ethanol by volume and 3.5% (w./v.) sodium chloride. 88% of the insulin is eluted from the resin.

*Example 15*

To a mixture containing vitamin B₁ hydrochloride is added 200 ml. of "Amberlite IRC–50" resin, on the sodium cycle. The mixture is stirred for 1 hour and the resin separated by filtration and washed with water and a 40 ml. aliquot of the washed resin is then eluted column-wise with an aqueous solution containing 70% methanol by volume and 5% (w./v.) ammonium chloride. The results are shown in Table 11.

TABLE 11

| Elutrient | Volume (cc.) | Vitamin B₁ eluted (percent) |
|---|---|---|
| 70% methanol/5% ammonium chloride | 40 | 56 |
| Do | 40 | 33 |
| Do | 40 | 5.5 |
| Do | 40 | 0.5 |
| Total | | 95 |

Example 16

A mixture containing sodium prednisolone phosphate is passed through a column containing 10 ml. of "Dowex 1–2X" resin, on the chloride cycle. The column is washed with water and then eluted first with aqueous 5% sodium chloride solution and then with an aqueous solution containing 93% methanol by volume and 3% (w./v.) ammonium chloride. The percentage of prednisolone phosphate eluted from the resin in each instance is shown in Tables 12 and 12a.

TABLE 12

| Elutrient | Volume (cc.) | Prednisolone phosphate eluted (percent) |
|---|---|---|
| 5% sodium chloride | 20 | 1.0 |

TABLE 12a

| Elutrient | Volume (cc.) | Prednisolone phosphate eluted (percent) |
|---|---|---|
| 93% methanol/5% ammonium chloride | 50 | 83 |

Example 17

Ten 10 ml. samples of "Amberlite IRC-50" resin containing 125 mg. of quinine per ml. of resin are eluted column-wise with 45 ml. of various elutrients. The elutrients used and the total percentage of quinine eluted from the resin employing each of the various elutrients is shown in Table 13.

TABLE 13

Elutrient: Quinine eluted (percent)
Water _____ 0
70% methanol (aq.) _____ 2.6
5% ammonium chloride (aq.) _____ 7.4
Aqueous solution containing 10% methanol by volume and 3% (w./v.) ammonium chloride 14.3
Aqueous solution containing 10% methanol by volume and 5% (w./v.) ammonium chloride 18.1
Aqueous solution containing 20% methanol by volume and 5% (w./v.) ammonium chloride 22.9
Aqueous solution containing 30% methanol by volume and 5% (w./v.) ammonium chloride 33.7
Aqueous solution containing 40% methanol by volume and 5% (w./v.) ammonium chloride 50.0
Aqueous solution containing 50% methanol by volume and 5% (w./v.) ammonium chloride 72.7
Aqueous solution containing 70% methanol by volume and 5% (w./v.) ammonium chloride 83.3

Example 18

To 2 l. of a mixture containing sodium novobiocin is added 200 ml. of "Dowex 1–2X" resin, on the chloride cycle, and the mixture stirred for 1 hour. The resin is removed by filtration and washed with 800 ml. water. Eight 10 ml. samples of this resin are then taken and each eluted column-wise with 45 ml. of a particular elutrient, as shown in Table 14.

TABLE 14

Elutrient: Sodium novobiocin eluted (percent)
70% methanol _____ 0
5% ammonium chloride (aq.) _____ 0
5% lithium chloride (aq.) _____ 0
Aqueous solution containing 40% methanol by volume and 5% (w./v.) ammonium chloride 25.8
Aqueous solution containing 50% methanol by volume and 5% (w./v.) ammonium chloride 50.4
Aqueous solution containing 70% methanol by volume and 5% (w./v.) ammonium chloride 85.4
Aqueous solution containing 90% methanol by volume and 3% (w./v.) ammonium chloride 100
Aqueous solution containing 98% methanol by volume and 5% (w./v.) lithium chloride ___ 96.2

Various changes and modifications of the invention can be made, and to the extent that such variations incorporate the spirit of the instant invention, they are intended to be included within the scope of the appended claims.

We claim:

1. In a process for recovering an ionic organic substance from an ion exchange resin on which said substance has been previously adsorbed the improvement which comprises eluting said resin containing said ionic organic substance with an elutrient mixture comprising at least 50% by volume of a water-miscible organic solvent, from about 0.1% to about 15% by weight of an ionizable salt, and water in an amount sufficient to solubilize said salt; said salt being soluble in said solvent-water mixture and said elutrient mixture also being a solvent for said ionic organic substance.

2. The process of claim 1 wherein the ionic organic substance is novobiocin.

3. The process of claim 1 wherein the ionic organic substance is penicillin.

4. The process of claim 1 wherein the ionic organic substance is morphine.

5. The process of claim 1 wherein the ionic organic substance is gibberellic acid.

6. The process of claim 2 wherein the organic solvent is methanol and the salt is ammonium chloride.

7. The process of claim 3 wherein the organic solvent is methanol and the salt is ammonium chloride.

8. The process of claim 5 wherein the organic solvent is methanol and the salt is ammonium chloride.

References Cited by the Examiner

UNITED STATES PATENTS 3,000,792  9/1961  Denkewalter et al. ____ 260—210
3,000,873  9/1961  Wolfe _____ 260—210

FOREIGN PATENTS 513,088  5/1955  Canada.

LEWIS GOTTS, *Primary Examiner.*